June 7, 1932.    K. T. WILLIAMSON ET AL    1,861,516
BATTERY CHARGING APPARATUS
Filed Dec. 5, 1930
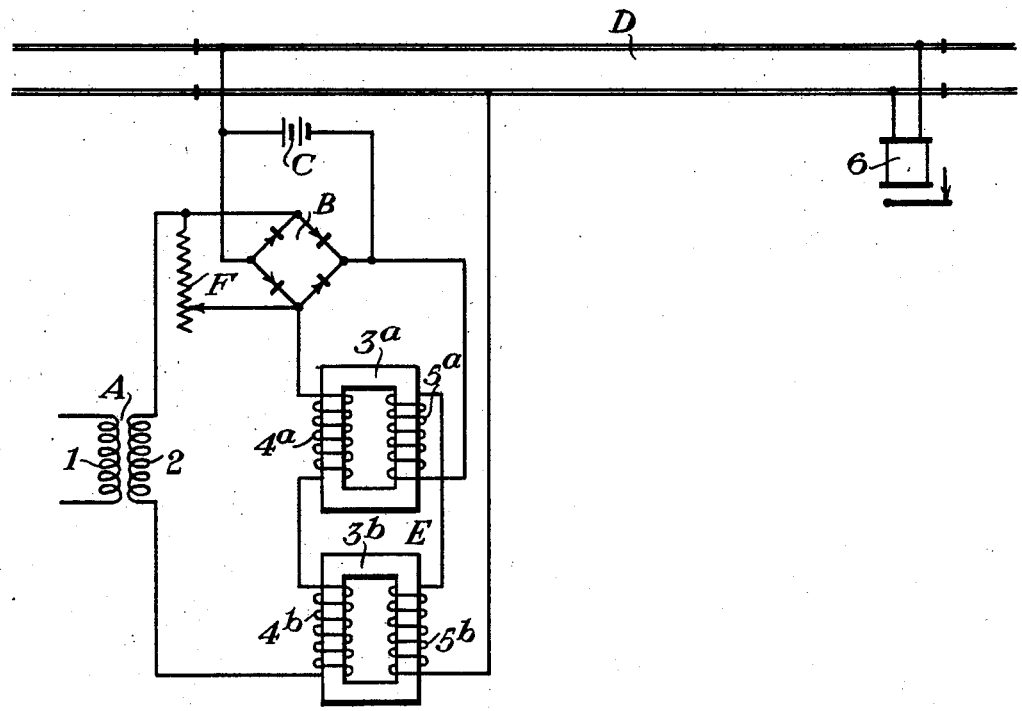
INVENTORS:
K. T. Williamson, and
O. I. Seaverson,
BY
THEIR ATTORNEY.

Patented June 7, 1932

1,861,516

UNITED STATES PATENT OFFICE

KENNETH T. WILLIAMSON AND OSWALD I. SEAVERSON, OF WILKINSBURG, PENNSYLVANIA, ASSIGNORS TO THE UNION SWITCH & SIGNAL COMPANY, OF SWISSVALE, PENNSYLVANIA, A CORPORATION OF PENNSYLVANIA

BATTERY CHARGING APPARATUS

Application filed December 5, 1930. Serial No. 500,288.

Our invention relates to battery charging apparatus, and particularly to apparatus of the type involving a source of alternating current, a rectifier receiving current from such source, and a battery and a load both supplied with unidirectional current by the rectifier. One object of our invention is the provision, in apparatus of this character, of means for causing the output of the rectifier to vary substantially in direct proportion to the current drawn by the load.

We will describe one form of apparatus embodying our invention, and will then point out the novel features thereof in a claim.

The accompanying drawing is a diagrammatic view showing one form of apparatus embodying our invention.

Referring to the drawing, the reference character A designates a transformer, the primary 1 of which is supplied with alternating current from a source which is not shown. The secondary 2 of transformer A is connected with the input terminals of a full-wave rectifier B, and the output terminals of this rectifier are connected with a battery C and also with a load D. This load, as here shown, is a railway track circuit comprising the track rails and a track relay 6.

The reference character E designates a regulating reactor comprising two magnetizable cores $3^a$ and $3^b$, each of which cores is provided with a primary 4 and a secondary 5. The primaries $4^a$ and $4^b$ of the two cores $3^a$ and $3^b$ are connected in series and are interposed between one terminal of the transformer secondary 2 and one input terminal of the rectifier B. The two secondaries $5^a$ and $5^b$ are, likewise, connected in series and are interposed between one output terminal of the rectifier B and one terminal of the load D. The secondaries $5^a$ and $5^b$ are reversed with respect to each other, so that at any given instant the electromotive force due to the alternating flux in core $3^a$ and the electromotive force due to the alternating flux in core $3^b$ are in opposition.

The direct current from the rectifier B flows from the positive output terminal of the rectifier, through the secondary coils $5^a$ and $5^b$ of the reactor E, then through the load D, and back to the negative terminal of the rectifier B. The direct current thus supplied to the coils $5^a$ and $5^b$ tends to saturate the cores of the reactor E, thus reducing the impedance of the primary coils $4^a$ and $4^b$, and this in turn results in a higher voltage across the input terminals of the rectifier. It follows that as the current drawn by the load increases, the rectifier output increases in an amount depending upon the ratio of turns on the cores $3^a$ and $3^b$ and on the characteristics of these cores.

Connected across the input terminals of the rectifier B is an adjustable impedance F, which, as here shown, is a non-inductive resistance. The current flowing through this impedance increases the voltage drop across the primary coils $4^a$ and $4^b$ of the reactor E, thereby reducing the voltage across the input terminals of the rectifier. We have found that this impedance F has the effect of causing the output of the rectifier B to more closely follow variations in the load D than when the impedance is not provided. The impedance F lowers the level of the rectifier output to a point such that the output is almost a straight line curve between the extreme limits.

The main purpose of the shunt F is to provide satisfactory operating characteristics when the load D is light. Without the shunt F, the output of the rectifier B will be much greater in proportion to small load currents than for large load currents. This is particularly undesirable when the battery is of the primary type. By providing the shunt F across the rectifier B, a small additional alternating current flows in the windings $4^a$ and $4^b$ of reactor E, resulting in a greater drop across these windings, and hence a lower voltage across the input terminals of the rectifier. The impedance of the shunt F may be so chosen that when the current drawn by the load D is zero, the output of the rectifier B will be zero. Then, as the load current increases, the effect of the shunt decreases, because, even though the variation in alternating current through the rectifier may be in the ratio of 15 to 1 from full load to light load, the alternating current drawn by the shunt for the same variation of load varies in a ratio of less than 2 to 1. Hence, at light loads, the shunt current is a large percentage of the total current through the windings $4^a$ and $4^b$, whereas at heavy loads, the shunt current is a very small percentage of the total current through these windings. It follows that when the shunt F is used, the rectifier output will follow the load variations much more closely than without the shunt, and it also follows that the rectifier is prevented from charging the battery when the load current is small.

Although we have herein shown and described only one form of battery charging apparatus embodying our invention, it is understood that various changes and modifications may be made therein within the scope of the appended claim without departing from the spirit and scope of our invention.

Having thus described our invention, what we claim is:

In combination, a source of alternating current, a rectifier receiving current from said source, a battery and a load receiving current from said rectifier, a regulating reactor having a primary interposed between said source and the rectifier and a secondary interposed between the rectifier and said load, and an impedance separate from and independent of said reactor and connected across the input terminals of said rectifier.

In testimony whereof we affix our signatures.

KENNETH T. WILLIAMSON.
OSWALD I. SEAVERSON.